United States Patent
Nachawati

(10) Patent No.: US 11,311,139 B2
(45) Date of Patent: Apr. 26, 2022

(54) BEVERAGE DISPENSER SYSTEMS AND METHODS

(71) Applicant: PepsiCo, Inc., Purchase, NY (US)

(72) Inventor: Maher Nachawati, Purchase, NY (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 17/157,282

(22) Filed: Jan. 25, 2021

(65) Prior Publication Data

US 2021/0137305 A1   May 13, 2021

Related U.S. Application Data

(60) Division of application No. 15/885,434, filed on Jan. 31, 2018, now Pat. No. 10,932,610, which is a continuation of application No. 14/947,636, filed on Nov. 20, 2015, now Pat. No. 9,883,766.

(51) Int. Cl.
*A47J 31/40* (2006.01)
*A47J 31/52* (2006.01)
*B65D 85/804* (2006.01)

(52) U.S. Cl.
CPC .............. *A47J 31/407* (2013.01); *A47J 31/52* (2013.01); *A47J 31/521* (2018.08); *B65D 85/8043* (2013.01)

(58) Field of Classification Search
CPC ........ A47J 31/52; A47J 31/521; A47J 31/407; B65D 85/8043
See application file for complete search history.

(56) References Cited

U.S. PATENT DOCUMENTS

| | | | |
|---|---|---|---|
| 3,292,527 A | 12/1966 | Strasse | |
| 3,628,444 A | 12/1971 | Mazza | |
| 6,845,886 B2 | 1/2005 | Henry et al. | |
| 8,808,775 B2 * | 8/2014 | Novak | A23L 2/54 |
| | | | 261/DIG. 7 |
| 9,119,505 B2 | 9/2015 | Guard et al. | |
| 9,307,860 B2 * | 4/2016 | Burrows | A47J 31/3695 |
| 2009/0223375 A1 | 9/2009 | Verbeek | |
| 2013/0011521 A1 | 4/2013 | Weijers et al. | |
| 2015/0068404 A1 | 3/2015 | Rivera | |
| 2016/0051080 A1 * | 2/2016 | Lo Faro | A47J 31/3633 |
| | | | 99/283 |

(Continued)

FOREIGN PATENT DOCUMENTS

EP    2000063 A1    10/2008

OTHER PUBLICATIONS

International Search Report in corresponding PCT Application, International Application No. PCT/US2016/062891, dated Jan. 31, 2017.

*Primary Examiner* — J C Jacyna
(74) *Attorney, Agent, or Firm* — Sterne, Kessler, Goldstein & Fox P.L.L.C.

(57) ABSTRACT

A cartridge adaptor system may include a puncturing device; a nozzle adaptor including: a puncture port configured to receive the puncturing device; a nozzle coupling portion configured to releasably couple to a beverage dispenser nozzle; and a cartridge coupling portion configured to releasably couple to a cartridge containing a beverage ingredient; and a cartridge holster having a receiving portion for receiving a portion of the cartridge. The puncturing device may be configured to puncture the cartridge thereby releasing the beverage ingredient.

14 Claims, 8 Drawing Sheets

(56) References Cited

U.S. PATENT DOCUMENTS

| | | |
|---|---|---|
| 2016/0106136 A1 | 4/2016 | Gordon et al. |
| 2016/0106255 A1* | 4/2016 | Gordon ................. B01F 23/236 99/295 |
| 2016/0106256 A1* | 4/2016 | Gordon ............... B01F 23/2362 99/295 |
| 2017/0190555 A1* | 7/2017 | Green ................. B67D 1/0078 |

* cited by examiner

BEVERAGE DISPENSER SYSTEMS AND METHODS

FIELD

The described embodiments relate generally to a beverage dispenser. In particular, embodiments relate to cartridge valve adaptor systems and methods used in a beverage dispenser.

BACKGROUND

Various systems and methods for cartridge valve adaptor systems may be used.

SUMMARY

Some embodiments are directed to a cartridge adaptor system, including a puncturing device; a nozzle adaptor including a puncture port configured to receive the puncturing device, a nozzle coupling portion configured to releasably couple to a beverage dispenser nozzle, and a cartridge coupling portion configured to releasably couple to a cartridge containing a beverage ingredient; and a cartridge holster having a receiving portion for receiving a portion of the cartridge, wherein the puncturing device is configured to puncture the cartridge thereby releasing the beverage ingredient.

In some embodiments, a fluid regulator pushes a fluid through nozzle and cartridge, thereby mixing the beverage ingredient and fluid. In embodiments, a first fluid regulator pushes a fluid into the nozzle and a second fluid regulator suctions the beverage ingredient from the cartridge into a nozzle, thereby mixing the beverage ingredient and fluid.

In some embodiments, the cartridge holster is adjustable relative to the cartridge coupling portion such that cartridges can be loaded and unloaded into the cartridge receiving portion. In some embodiments, the cartridge holster is configured to be adjustably mounted to a valve body of valve 100. In some embodiments the cartridge holster is configured to be adjustably mounted to a beverage dispenser.

In some embodiments the cartridge contains a single serving of beverage ingredient. In some embodiments the cartridge is a part of a limited-time or limited geographic area offer. In some embodiments the cartridge comprises one of a bag, shell, box, and pod. In some embodiments, the cartridge is reusable. In some embodiments the cartridge holster is configured to automatically shut off a second fluid regulator when coupled to the nozzle adaptor.

Some embodiments are directed towards a post-mix dispensing system, including: a beverage dispenser nozzle; a first fluid regulator; a second fluid regulator; a control system configured to control the fluid regulators; a puncturing device configured to puncture a cartridge containing a beverage ingredient thereby releasing the beverage ingredient; a nozzle adaptor including a puncture port configured to receive the puncturing device, a nozzle coupling portion configured to releasably couple to the nozzle, and a cartridge coupling portion configured to releasably couple to the cartridge; and a cartridge holster having a receiving portion for receiving a portion of the cartridge.

In some embodiments the control system controls the first fluid regulator to push a fluid through nozzle and cartridge, thereby mixing the beverage ingredient and fluid. In some embodiments the control system controls the first fluid regulator to push a fluid into the nozzle, and controls the second fluid regulator to suction the beverage ingredient from the cartridge and into the nozzle thereby mixing the beverage ingredient and fluid. In some embodiments the control system automatically shuts off a second fluid regulator when the cartridge holster is coupled to the nozzle adaptor.

In some embodiments the cartridge holster is adjustable relative to the cartridge coupling portion such that cartridges can be loaded and unloaded into the cartridge receiving portion. In some embodiments the cartridge holster is mounted to the valve body. In some embodiments the cartridge holster is mounted to a beverage dispenser.

Some embodiments are drawn towards a method for producing a beverage, including providing access to a cartridge containing a beverage ingredient for a system, locating the cartridge to engage a cartridge adaptor system including a cartridge holster having a receiving portion for receiving a portion of the cartridge, a nozzle adaptor including a nozzle coupling portion configured to releasably couple to a beverage dispenser nozzle and a cartridge coupling portion configured to releasably couple to the cartridge, releasing the beverage ingredient from the cartridge, and flowing a fluid to allow the fluid to mix with the beverage ingredient and produce a finished beverage.

Some embodiments are drawn towards a method for producing a limited-time-offer beverage, including: receiving access to a cartridge containing a beverage ingredient for a dispensing system on a restricted basis; locating the cartridge in to engage a cartridge adaptor system, including: a cartridge holster having a receiving portion for receiving a portion of the cartridge; a puncturing device; a nozzle adaptor including a puncture port configured to receive the puncturing device, a nozzle coupling portion configured to releasably couple to a beverage dispenser nozzle, and a cartridge coupling portion configured to releasably couple to the cartridge; releasing the beverage ingredient from the cartridge; flowing a fluid through the cartridge adaptor system to allow the fluid to mix with the beverage ingredient and produce a finished beverage. In some embodiments, one of the fluid regulators is configured to regulate the flow of a predetermined or programmed volume of fluid. In some embodiments the restricted basis is a limited time. In some embodiments the restricted basis is a limited geographical area. In some embodiments, the method further includes controlling a first regulator to push a fluid into the nozzle thereby mixing the beverage ingredient and fluid. In some embodiments, the method further includes controlling a first regulator to push a fluid into the nozzle; and controlling a second regulator to suction the beverage ingredient from the cartridge and into the nozzle thereby mixing the beverage ingredient and fluid. In some embodiments, the method further includes automatically shutting off a second regulator when the cartridge holster is coupled to the nozzle adaptor.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
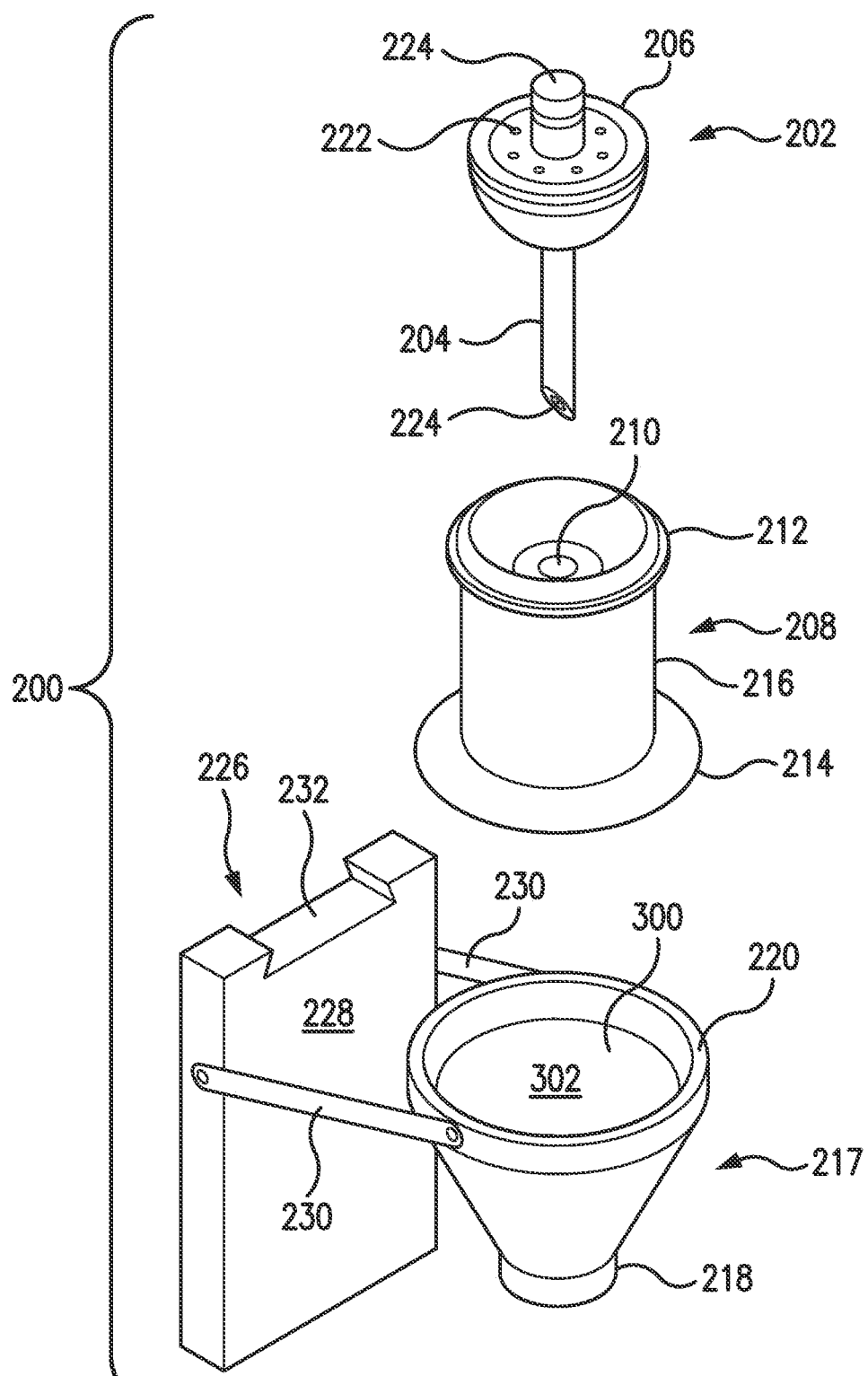
FIG. 1 shows an exploded assembly perspective view of a cartridge adaptor system according to an embodiment and an exemplary cartridge according to an embodiment.

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Beverage dispensing units have become a popular way for food and beverage establishments to create on-site fountain beverages. Typically, these units include several bag-in-box containers that each contains syrup, a liquid source that dispenses a liquid, a mixing unit, and a dispensing unit. Syrup is pumped from the bag-in-box container into the mixing unit where it is mixed with liquid to form a beverage that is then dispensed through the dispensing unit. Typically, a pump causes the syrup to be released from the bag-in-box container into the mixing unit.

Conventional beverage dispensing units and systems position the bag-in-box containers and the pump in a back room, such as a storage room or food preparation area, because they can be noisy and can be distracting to patrons. The dispensing unit is oftentimes positioned in the foodservice area of the restaurant or bar so that staff and/or patrons may have access to it. This unit is time-consuming to assemble, disassemble, and service because it is positioned in multiple rooms and because portions of the unit are difficult to access. Assembly, disassembly, and service of this beverage dispensing unit are oftentimes performed by a highly skilled technician due to the complex nature of the unit.

Many carbonated and noncarbonated beverages are available on the market and are in demand. For example, restaurants, cafeterias, fast food facilities, and the like often utilize beverage dispensers to provide such beverages to their customers (either from behind the counter or self-serve). These dispensers often used "post-mix" beverage dispensing valves, which use two separate flow paths to dispense water (carbonated or non-carbonated, depending on the type of beverage) and syrup into a cup, in which the water and syrup mix to produce a beverage. Alternatively, "pre-mix" dispensers may dispense pre-mixed beverages.

Typically, post-mix beverage dispensing valves dispense only one beverage flavor per valve. The number of these "one-flavor" valves that a dispenser can accommodate is limited, and thus the valves are assigned to the most popular flavors, typically carbonated beverages (cola, diet cola, lemon-lime, root beer, etc.). Additional noncarbonated beverage flavors (e.g., iced tea, lemonade, pink lemonade, fruit punch, raspberry iced tea, etc.), require additional dispensers. In many cases, these dispensers are dedicated to a single flavor, to prevent mixing flavors between beverage dispensing cycles. This takes up additional counter space, and increases beverage dispensing cost.

A company may provide limited time offer ("LTO") beverage products in bottle and cans. It may offer a refreshing new flavor for a limited time allowing incremental volume through the generation of interest in something new and novel. Restricting access to certain products may drive demand, and can be advantageous for a company. The currently existing post-mix beverage dispensing equipment generally can only deliver what is already in a line requiring that a technician flush or replace certain supply lines such as syrup lines and load the new product. It can be advantageous to allow foodservice customers to offer tailored products through single or multi serve packages allowing limited time offers for their consumers, without the need for such an intensive system overhaul.

Due to the infrastructure and nature of the systems, sometimes it is less desirable to provide for LTOs in a food and beverage setting (e.g., restaurant, convenience store, grocery, or the like) due to the changeover cost and equipment replacement. A rotating dispenser offering an LTO may require components such as the syrup line to be replaced to avoid flavor cross-contamination from previous syrup flavors run through the line. Standard post mix systems can generally only dispense syrup products that are pumped through a line. A time intensive and complicated changeover is required to change flavors and flavor carryover becomes a risk when switching from pungent flavors to lighter flavors which necessitates line changes.

Additionally, LTOs in a post-mix environment from a supply chain and shelf life management perspective, making them prone to expiration. Utilizing single serve packages or the systems herein reduce wasted product and divide units to make inventory management simpler in a smaller format.

According to embodiments, for example, a customer may purchase a limited time offer and receive a single or multi serve cartridge or package, such as a pod or a packet, containing a beverage ingredient such as syrup, concentrate, powder, or the like. In some embodiments, the beverage ingredient is chilled in a refrigerator. The consumer may then place the cartridge in the post-mix cartridge adaptor system to allow still or carbonated water through the cartridge to mix with the beverage ingredient, thus creating a finished beverage without the stream of syrup from a bag in box. In some embodiments, a stream of nutritive or non-nutritive sweetener may be added, creating a finished beverage from more than two ingredients, in which one of the ingredients may not be disposed in the cartridge.

In some embodiments, an existing post-mix valve may be configured to accept a cartridge without other equipment, such that the cartridge is a specially designed cartridge to interact with the nozzle. In some embodiments, the cartridge holster may be a platform which the cartridge is placed on, and allows the cartridge to couple to the nozzle. In other embodiments, the cartridge holster may be mechanical or electrically adjustable in order to move the cartridge holster forward to allow the cartridge to be placed into a receiving portion of the cartridge holster. In some embodiments, once the cartridge is placed in the cartridge holster, the cartridge holster may automatically move into position such that the puncturing device punctures the cartridge while coupled to the nozzle through the nozzle adaptor, and begin creating the finished beverage.

In some embodiments, an identifier (e.g., barcode, RFID tag, or the like) may be coupled to the cartridge and be configured to indicate to the dispenser control attributes such as the volume of liquid to dispense through the syrup containing package, the level of carbonation in a carbonated platform, or the sweetness or brix level for a three stream platform (e.g., concentrate, sweetener, water/carbonated water).

In some embodiments, there may be a nutritive or non-nutritive sweetener stream as well as water or carbonated water provided in the beverage. The valve may include additional fluid streams. In some embodiments, the brix level may be controlled, along with carbonation level, and the like.

In some embodiments, the cartridge may be a single serve package and can be provided to the consumer from a store attendant. In other embodiments, the cartridge may be dispensed to the consumer through vending machine, or stored on a shelf. In some embodiments, the vending machine may be refrigerated and include an integrated point-of-sale ("POS") payment system that would dispense the cartridge requiring very little to no interaction from a store attendant.

These and other embodiments are discussed below with reference to the figures. However, those skilled in the art will readily appreciate that the detailed description given herein with respect to these figures is for explanatory purposes only and should not be construed as limiting.

Figure 2:
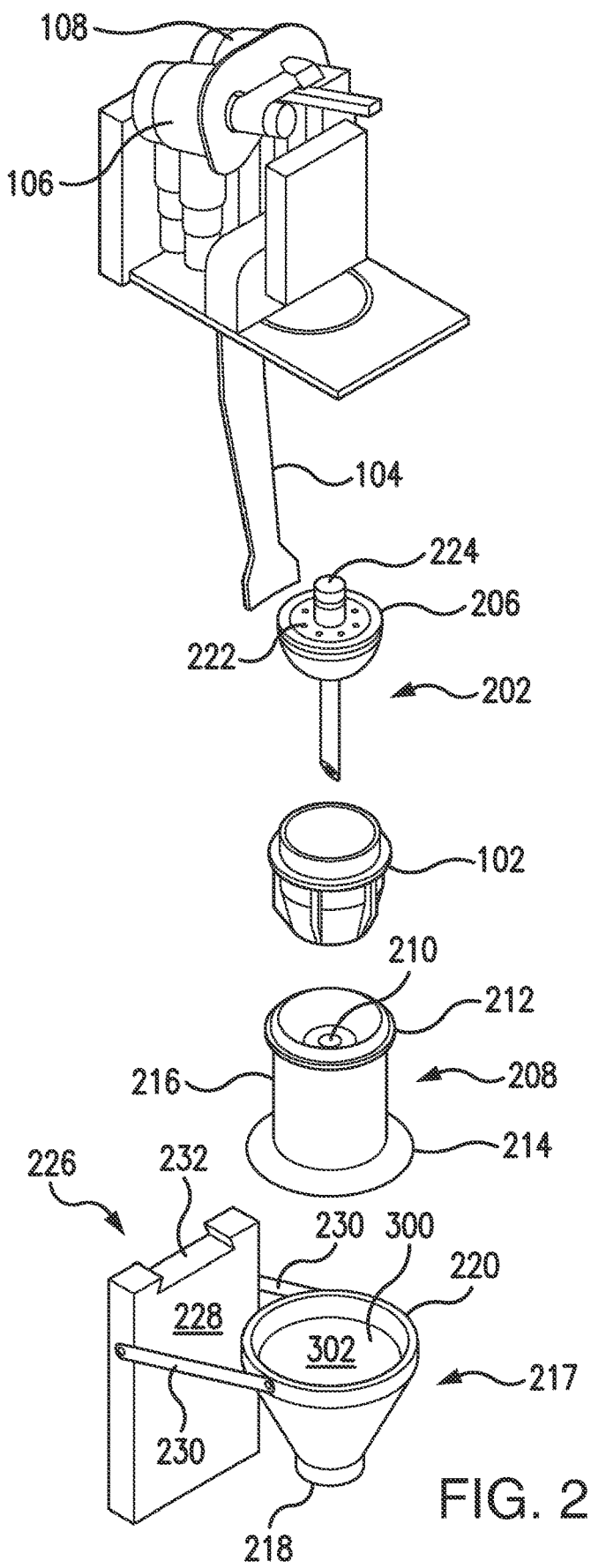
FIG. 2 shows an exploded assembly perspective view of a valve assembly with a cartridge adaptor system according to an embodiment.

Referring to FIGS. 1 and 2, cartridge adaptor system 200 may include a puncturing device 202; a nozzle adaptor 208; and cartridge holster 217. Nozzle adaptor 208 may include a puncture port 210 configured to receive the puncturing device 202. Nozzle adaptor 208 may also include a nozzle coupling portion 212 configured to releasably couple to a beverage dispenser nozzle 102, and a cartridge coupling portion 214 configured to releasably couple to a cartridge 300 containing a beverage ingredient 302. Nozzle adaptor 208 may include an elongate adaptor body 216. Cartridge holster 217 may have a receiving portion 220 for receiving a portion of the cartridge 300. In use, the puncturing device 202 is configured to puncture the cartridge 300, for example with the piercing portion 204, thereby releasing the beverage ingredient. In some embodiments, puncturing device 202 may include diffuser 206, which may diffuse one or more of the fluid or beverage ingredient 302. In some embodiments, the puncturing device 202 may replace nozzle 102.

In some embodiments, the valve 100 may include a portion control feature. In some embodiments, piercing portion 204 may be formed as a tubular member with a tip configured to puncture cartridge 300.

Figure 8:
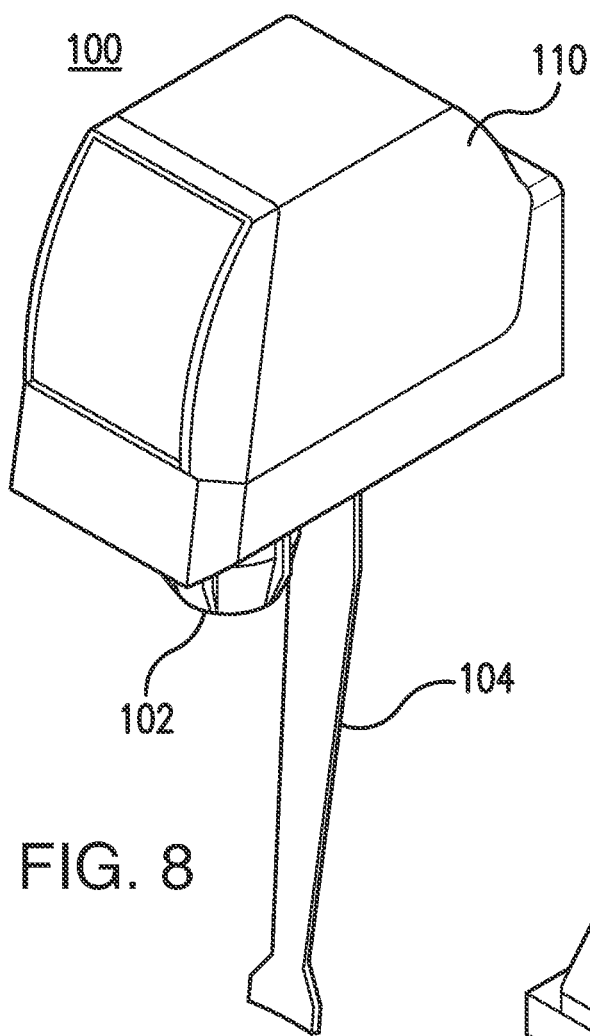
FIG. 8 shows a front right perspective view of a dispenser valve according to an embodiment.
Figure 9:
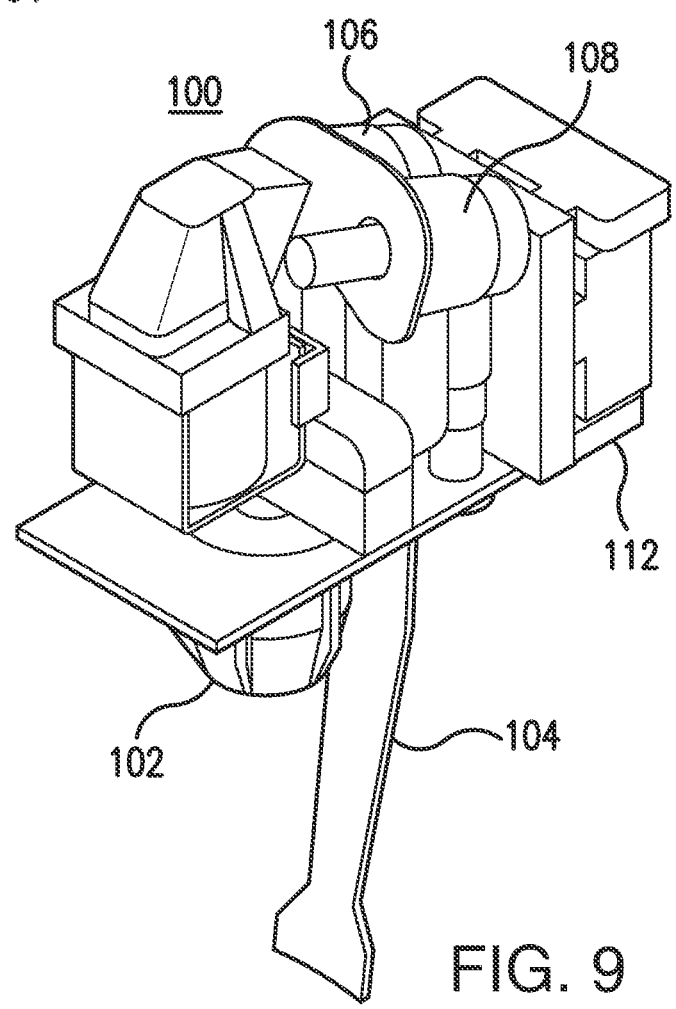
FIG. 9 shows a front right perspective view of a dispenser valve with a housing removed to show internal components according to an embodiment.

FIGS. 8 and 9 show a valve 100 according to an embodiment. In some embodiments, valve 100 may be a post-mix valve. As shown, valve 100 may include a nozzle 102, a housing 110, and an actuator 104 which may activate a beverage dispensing function of a beverage dispenser. FIG. 9 shows valve 100 of FIG. 8 with housing 110 removed. Valve 100 may have a first regulator 106 and a second regulator 108. In some embodiments, there may be included additional regulators. Regulators 106 and 108 may be fluid regulators, and may regulate fluid flow, such as a still or carbonated water component and a beverage ingredient 302 such as syrup. In some embodiments regulators 106/108 may regulate flow of other beverage ingredients 302, such as powder or the like.

In some embodiments, fluid regulator 106 controls flow of a fluid (e.g., still or carbonated water) pushed through nozzle 102 and cartridge 300, thereby mixing beverage ingredient 302 and fluid to produce a finished beverage. In some embodiments, a first fluid regulator 106 controls fluid flow of a fluid (e.g., still or carbonated water) pushed into nozzle 102 and a second fluid regulator 108 suctions beverage ingredient 302 from cartridge 300 into nozzle 102, thereby mixing the beverage ingredient and fluid to produce a finished beverage. In some embodiments where second fluid regulator 108 is configured to suction beverage ingredient 302 from cartridge 300, puncturing device 202 may be omitted in some embodiments. In some embodiments, fluid regulators 106/108 may be valves, orifices, or the like, and may be mechanically or electrically operated, for example. In some embodiments a pump or impeller may be coupled to the regulator and may be configured to increase or decrease flow rate according to beverage mixing parameters. In some embodiments, the fluid and beverage ingredient 302 may be mixed within the nozzle or valve components. In some embodiments the fluid and beverage ingredient 302 may be mixed once dispensed into a container such as a cup or mug.

As shown in FIGS. 1 and 2, in some embodiments, cartridge holster 217 is adjustable relative to the cartridge coupling portion 214 such that cartridges 300 can be loaded and unloaded into the cartridge receiving portion 220. In some embodiments, cartridge holster 217 is configured to be adjustably mounted to a valve body. Cartridge holster 217 may include a dispensing portion 218 from which a finished beverage is dispensed. Dispensing portion 218 may also dispense separate ingredients such as fluid or a beverage ingredient separately, for mixing in a cup. In some embodiments cartridge holster 217 is disposed under valve nozzle 102. In some embodiments cartridge holster 217 is configured to be adjustably mounted to a frame or housing of a beverage dispenser.

Figure 3A:
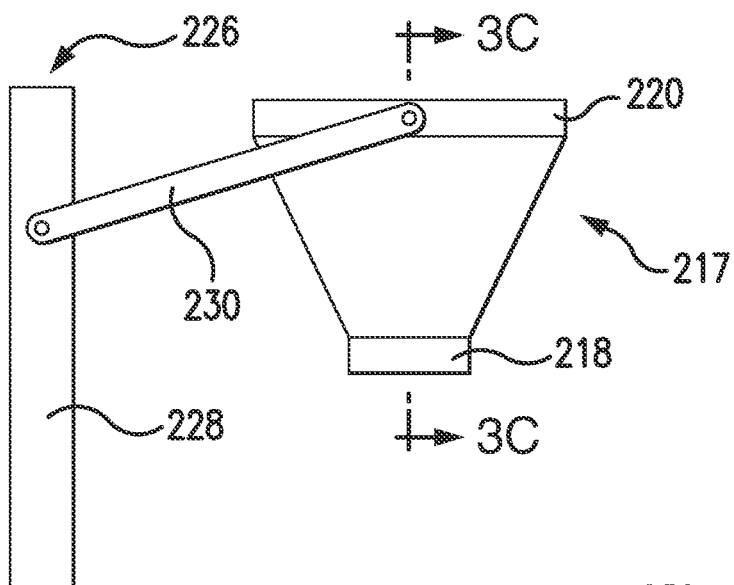
FIG. 3A shows a side view of a cartridge holster and mounting system according to an embodiment.
Figure 3B:
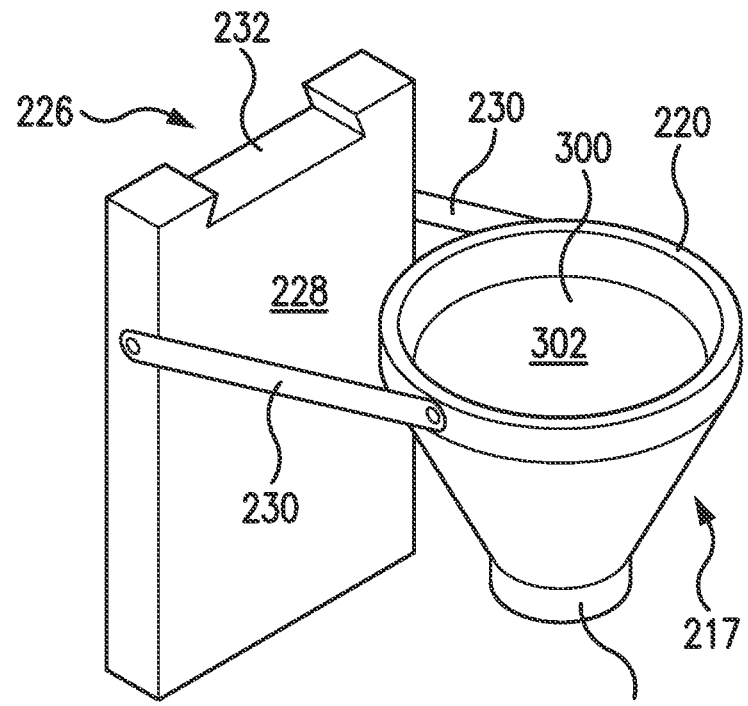
FIG. 3B shows a front perspective view of a cartridge holster and mounting system according to an embodiment.
Figure 3C:
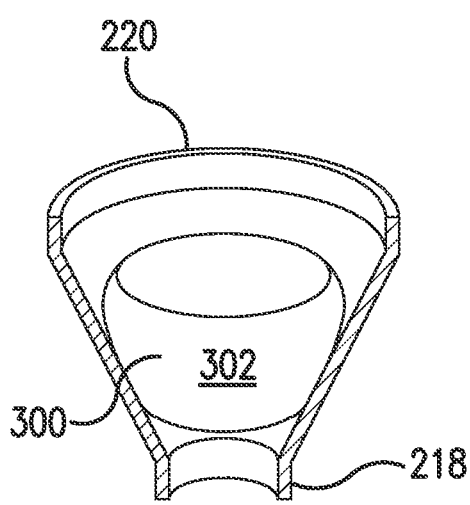
FIG. 3C shows a cut perspective view of a cartridge holster according to an embodiment.

As shown in FIGS. 3A, 3B, and 3C, cartridge holster 217 may be configured to receive cartridge 300 such that the cartridge is closely held within a cavity, such that cartridge 300 is sealed within cartridge holster 217. In some embodiments, cartridge holster 217 may include a mounting device 226, which may mount on or adjacent another structure, such as valve 100 or another dispensing system component, or structure adjacent the valve 100, including, but not limited to, a wall, countertop, table, or housing. In embodiments, mounting device 226 may include a mounting member 228, one or more mounting arms 230, and mounting surface 232. In some embodiments, the mounting member 228 is mounted to valve 100 on a bottom surface or edge of valve 100, at mounting surface 232. In this regard, the cartridge holster 217 and receiving portion 220 may be adjustably positioned below nozzle 102, and may avoid interference with the actuator 104 and/or housing 110. In some embodiments valve 100 includes holster mounting portion 112. Holster mounting portion 112 and cartridge holster 217 may be releasably or fixedly coupled, for example through fastener systems, slidable dovetail systems, snap-fit, or the like. In some embodiments, valve 100 includes cartridge holster 217 as an integral component. In some embodiments, the holster 217 may be integrated in the housing 110. In some embodiments, the action of positioning (e.g., lowering and raising) cartridge holster 217 into position to allow for cartridge 300 to be placed or to couple cartridge holster 217 to nozzle adaptor 208 may be automated using one or more actuation components, such as, for example, electric motors, solenoids, and the like that are operatively connected to mounting arms 230 and/or cartridge holster 217. In some embodiments, the action of positioning cartridge holster 217 may be facilitated mechanically, such as by springs or compressible pistons. The electrical, mechanical, or electro-mechanical actuation components may be disposed in mounting device 226, valve 100 or another dispensing system component, or a structure adjacent the valve 100, including, but not limited to, a wall, countertop, table, or housing.

In some embodiments cartridge 300 contains a single serving of beverage ingredient 302. In some embodiments cartridge 300 is a part of a limited-time or limited geographic area offer. In some embodiments the cartridge may be configured as a bag, shell, box, pod, or combinations thereof. In some embodiments cartridge may be made of a shell material and a puncturable material, such as foil or paper. In some embodiments, cartridge 300 is reusable, and may for example be reused by a consumer to add or create their own beverage ingredient 302. In some embodiments cartridge holster 217 is configured to automatically shut off one or more of the fluid regulators when coupled to the nozzle adaptor 208.

In some embodiments, puncturing device 202 may be integrated with nozzle 102, or may replace the nozzle 102 altogether. In some embodiments, puncturing device 202 may couple with the nozzle adaptor 208, cartridge 300, or cartridge holster 217. In some embodiments, nozzle 102 may couple with the cartridge 300 or cartridge holster 217.

With reference to FIGS. 4-7, various views of a valve assembly with a cartridge adaptor system of valve 100 and portions thereof are shown according to an additional embodiment. Characteristics of cartridge adaptor system 200 described herein may also apply to cartridge adaptor system shown in FIGS. 4-7 in some embodiments, and characteristics of cartridge adaptor system shown in FIGS. 4-7 described herein may also apply cartridge adaptor system 200 in some embodiments.

Figure 4:
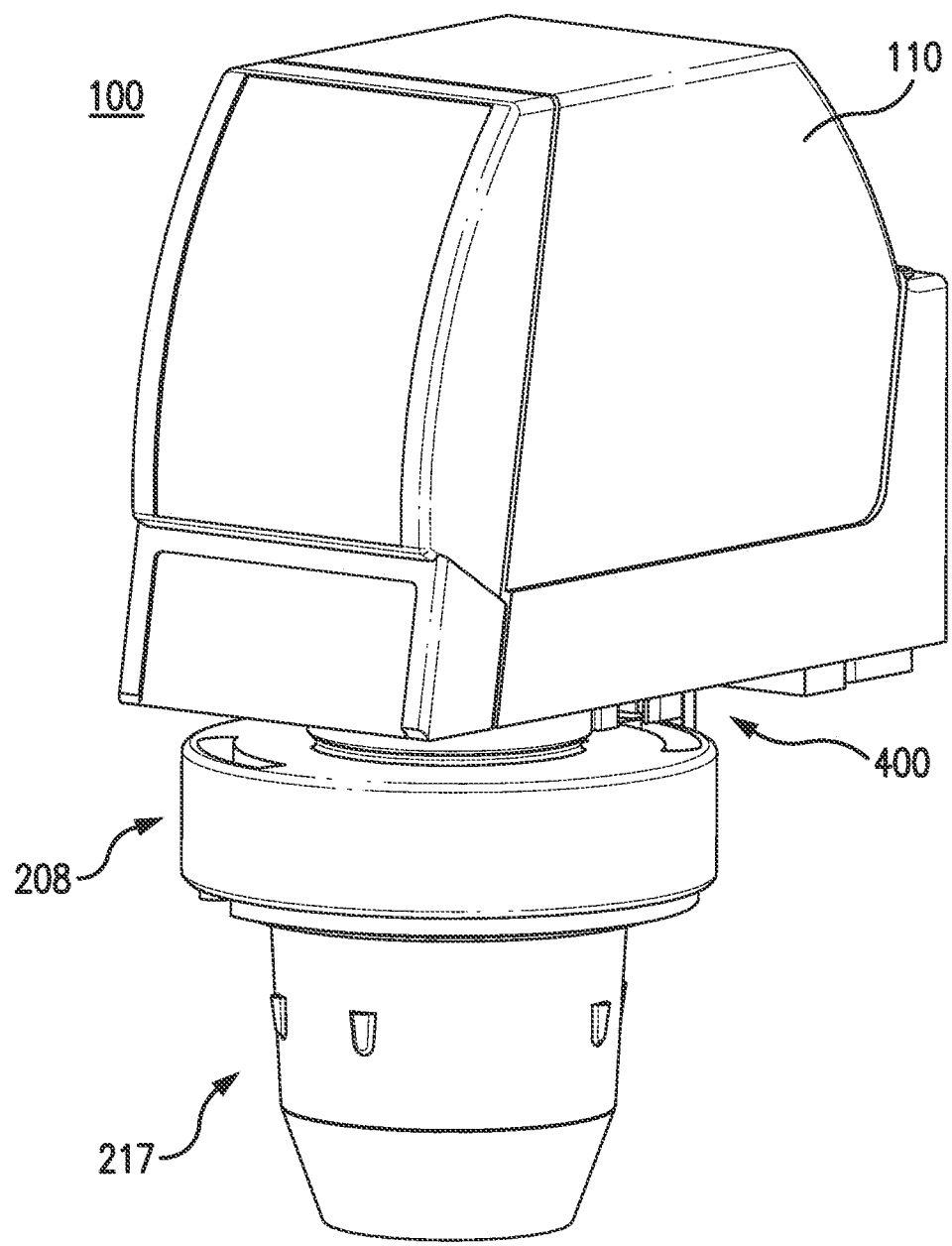
FIG. 4 shows an assembly perspective view of a valve assembly with a cartridge adaptor system according to an embodiment.
Figure 5:
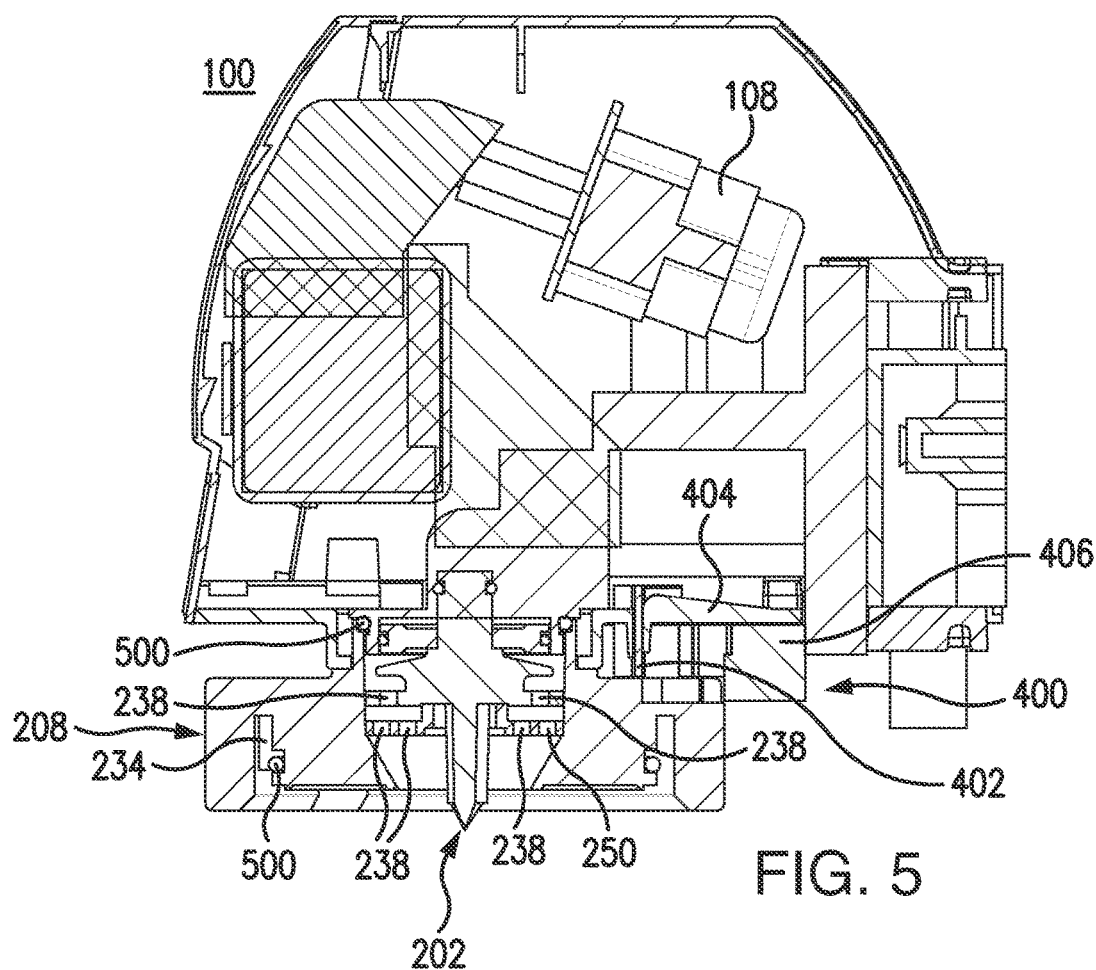
FIG. 5 shows a partial cross-sectional view of the valve assembly with a cartridge adaptor system according to an embodiment.
Figure 7:
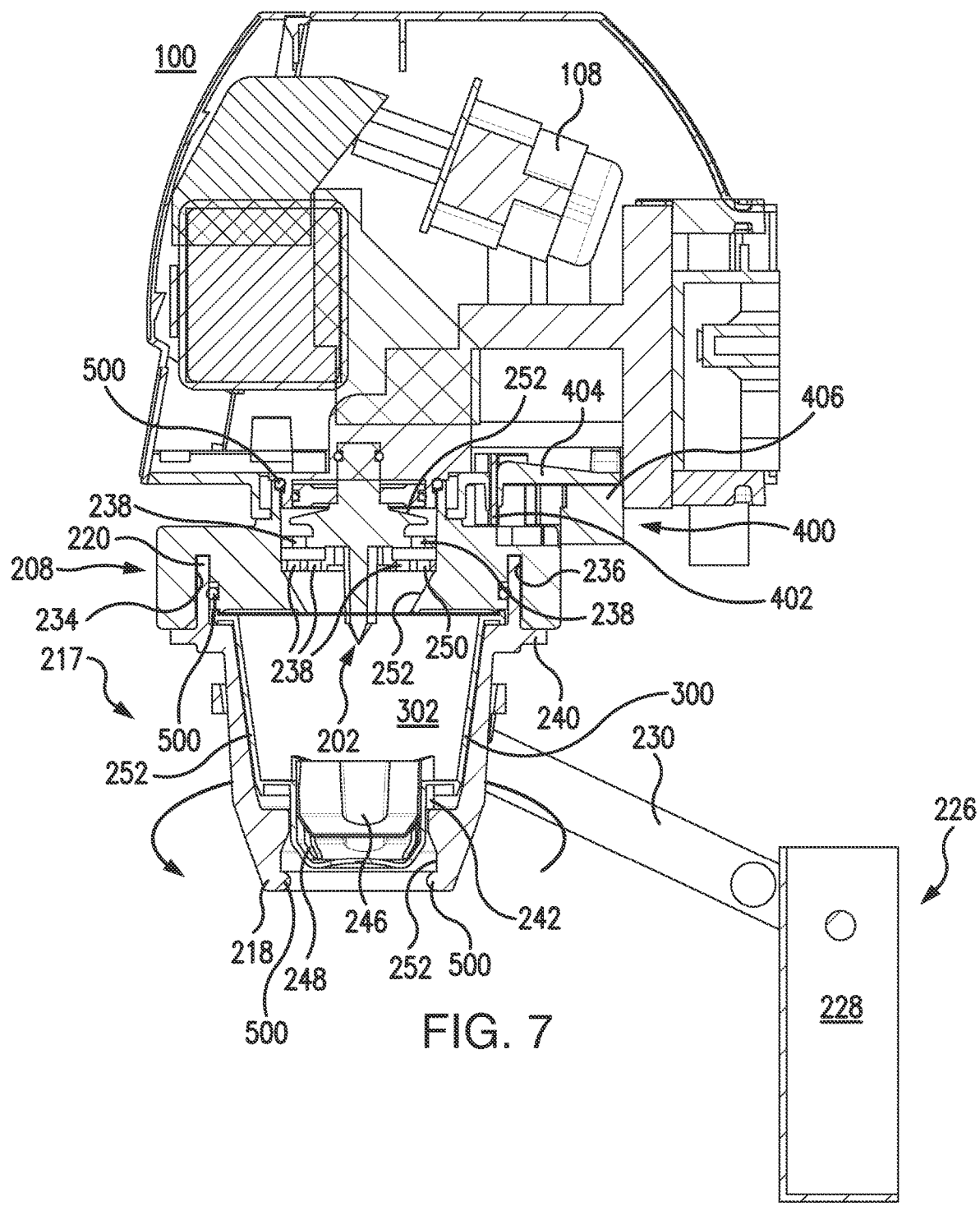
FIG. 7 shows an assembly perspective view of a valve assembly with a cartridge adaptor system according to an embodiment.

As shown in FIG. 5, nozzle adaptor 208 may be coupled directly to valve 100, including seal 500. Additionally, nozzle adaptor 208 may include a sealing groove 234 to receive a sealing flange 236 disposed on a distal end of cartridge holster 217. In some embodiments, the sealing surfaces may be reversed. In some embodiments, nozzle adaptor 208 may abut a second flange 240 extending generally radially from cartridge holster 217. In some embodiments, puncturing device 202 may include a solid or hollow needle configured to pierce a surface of cartridge 300. In some embodiments, puncturing device 202 may include a plurality of channels 238 to allow fluid to flow into nozzle adaptor 208. In some embodiments, nozzle adaptor 208 may include a plurality of channels 238 to allow fluid to flow into cartridge holster 217, and through cartridge 300. In some embodiments, puncturing device 202 may be mechanically coupled to nozzle adaptor 208. In some embodiments, puncturing device 202 may be threaded to nozzle adaptor 208. As shown in FIGS. 4, 5, and 7, in some embodiments, the nozzle adaptor 208 may contain a locking system 400 to prevent accidental removal while twisting on the holster 217. In some embodiments, locking system 400 includes an adaptor lock member 402 associated with nozzle adaptor 208, and first and second valve lock members 404 and 406 associated with valve 100 and configured to engage adaptor lock member 402. In some embodiments, adaptor lock member 402 may be a separate component from nozzle adaptor 208, or may be integrally formed as a single piece. In some embodiments, first and second valve lock members 404 and 406 may be a separate component from valve 100, or may be integrally formed as a single piece. When locking system 400 is engaged, holster 217 may be coupled to nozzle adaptor 208, and locking system 400 may ensure that the nozzle adaptor 208 is not removed from valve 100 during twisting of holster 217.

Figure 6:
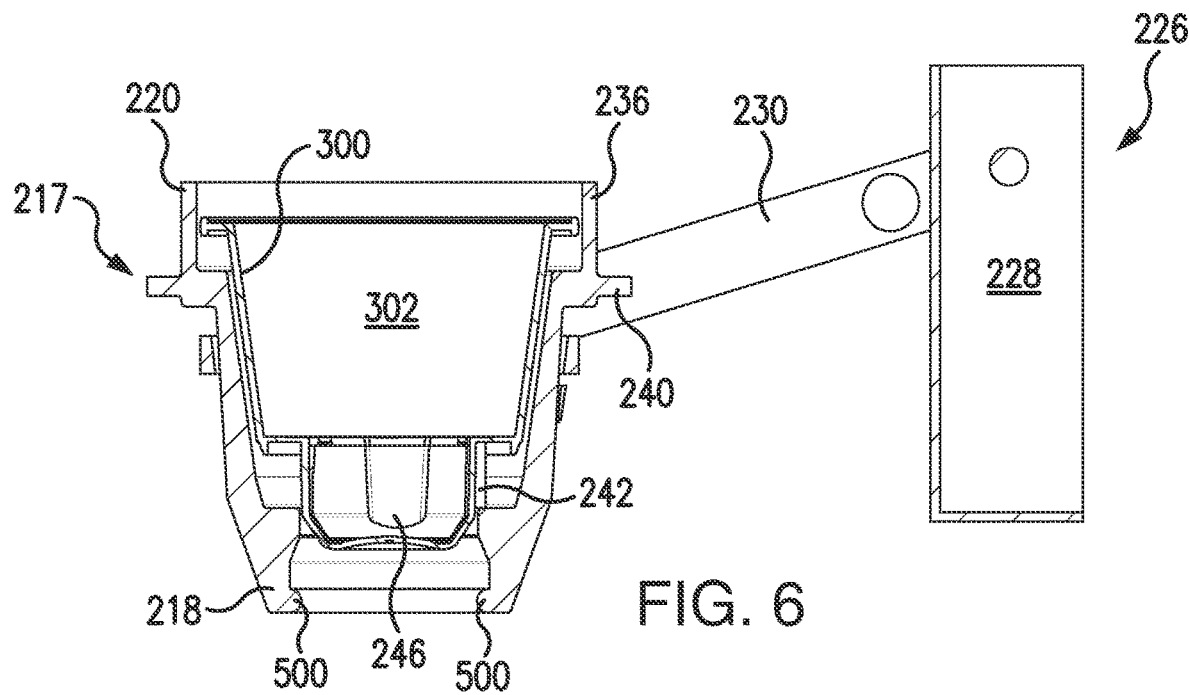
FIG. 6 shows a side cross-sectional view of a cartridge holster and mounting system according to an embodiment.

As shown in FIGS. 6 and 7, in some embodiments, cartridge 300 may include internal structure such as teeth 242 configured to puncture an internal liner within cartridge 300 configured to contain beverage ingredient 302. In some embodiments, cartridge 300 may include internal structure such as teeth 242 configured to puncture a lower surface of cartridge 300 such that fluid may flow through cartridge 300. In some embodiments, teeth 242 may include external portions that may engage a surface of cartridge holster 217 such that the teeth are pushed into cartridge 300 as the cartridge holster 217 couples to nozzle adaptor 208. In some embodiments, teeth 242 may be coupled to internal structure 246. Internal structure 246 may be configured to seal cartridge apertures 248. In some embodiments, cartridge holster 217 may be configured to lock to nozzle adaptor 208 through a twist lock system.

In embodiments, piercing portion 204 may have a channel through which fluid such as still or carbonated water flows during use. In some embodiments, diffuser 206 may be configured to mix the fluid and beverage ingredient 302. In some embodiments, cartridge holster 217 may include a mixing portion at the distal end of the holster, such as a static liquid shear generator 500 (shown in FIG. 6, for example), where the fluid and beverage ingredient 302 may mix prior to being dispensed. In some embodiments, static liquid shear generator 500 may be configured as a protrusion, groove, flange, lip, or the like. In some embodiments, static liquid shear generator 500 may be disposed on a portion of the inner surface of holster 217, or may be disposed along an entire inner circumference of holster 217. In some embodiments, static liquid shear generator 500 may be configured as a separate component, removable from holster 217. In some embodiments, nozzle adaptor 208 may include a separate flow plate 250 that may direct or diffuse fluid flow. In some embodiments puncturing device 202 may include deflection surfaces 252 configured to direct fluid flow through the system. In some embodiments, deflection surfaces 252 may be angled such that the fluid path expands or contracts along a flow path. In some embodiments, the hydraulic diameter through the system may vary. In some embodiments, nozzle adaptor 208 and cartridge holster 217 may also include deflection surfaces 252 to control fluid flow through the system.

Some embodiments are drawn towards a method for producing a beverage, including providing access to a cartridge containing a beverage ingredient for a system, locating the cartridge to engage a cartridge adaptor system including a cartridge holster having a receiving portion for receiving a portion of the cartridge, a nozzle adaptor including a nozzle coupling portion configured to releasably couple to a beverage dispenser nozzle and a cartridge coupling portion configured to releasably couple to the cartridge, releasing the beverage ingredient from the cartridge, and flowing a fluid to allow the fluid to mix with the beverage ingredient and produce a finished beverage.

Some embodiments are drawn towards a method for producing a limited-time-offer beverage. Such a method may include providing, receiving, or restricting access to a cartridge containing a beverage ingredient. In some embodiments the beverage ingredient may be provided on a restricted basis. In some embodiments, the beverage may be formed by a post-mix process. In some embodiments, the beverage may be formed by a pre-mix process. In embodiments, cartridge 300 may be engaged with cartridge adaptor system 200, which may include cartridge holster 217 having a receiving portion for receiving a portion of the cartridge; a puncturing device; a nozzle adaptor including a puncture port configured to receive the puncturing device, a nozzle coupling portion configured to releasably couple to a beverage dispenser nozzle, and a cartridge coupling portion configured to releasably couple to the cartridge; releasing the beverage ingredient from the cartridge; flowing a fluid through the post-mix cartridge adaptor system to allow the fluid to mix with the beverage ingredient and produce a finished beverage. In some embodiments the restricted basis is a limited time, for example less than six months, less than 3 months, less than 1 month. In some embodiments, the limited time may coincide with another limited time event, such as a first-run movie in theaters, sports franchise promotion, crowd-sourced flavor competition, and the like. In some embodiments the restricted basis is a limited geographical area, such as a limited country release, limited state release, or other limited locality release. In some embodiments, the limited geographical area may be a particular retail environment, such as a particular convenience store or restaurant, and the like. In some embodiments, the beverage ingredient may be a staple product for a company, and not linked to an LTO. In some embodiments, the method further includes controlling a first regulator to push a fluid into the nozzle thereby mixing the beverage ingredient and fluid. In some embodiments, the method further includes controlling a first regulator to push a fluid into the nozzle; and controlling a second regulator to suction the beverage ingredient from the cartridge and into the nozzle thereby mixing the beverage ingredient and fluid. In some embodiments, the method further includes automatically shutting off a second regulator when the cartridge holster is coupled to the nozzle adaptor.

As discussed above, in some embodiments, the cartridge may be a single serve package and can be provided to the consumer from a store or restaurant attendant. In other embodiments, the cartridge may be dispensed to the consumer through a vending machine, or stored on a shelf. In some embodiments, the vending machine may be refrigerated and include an integrated point-of-sale ("POS") payment system that would dispense the cartridge requiring very little to no interaction from a store attendant.

In some embodiments, the system may be operated entirely by an attendant, rather than the consumer.

Figure 10:
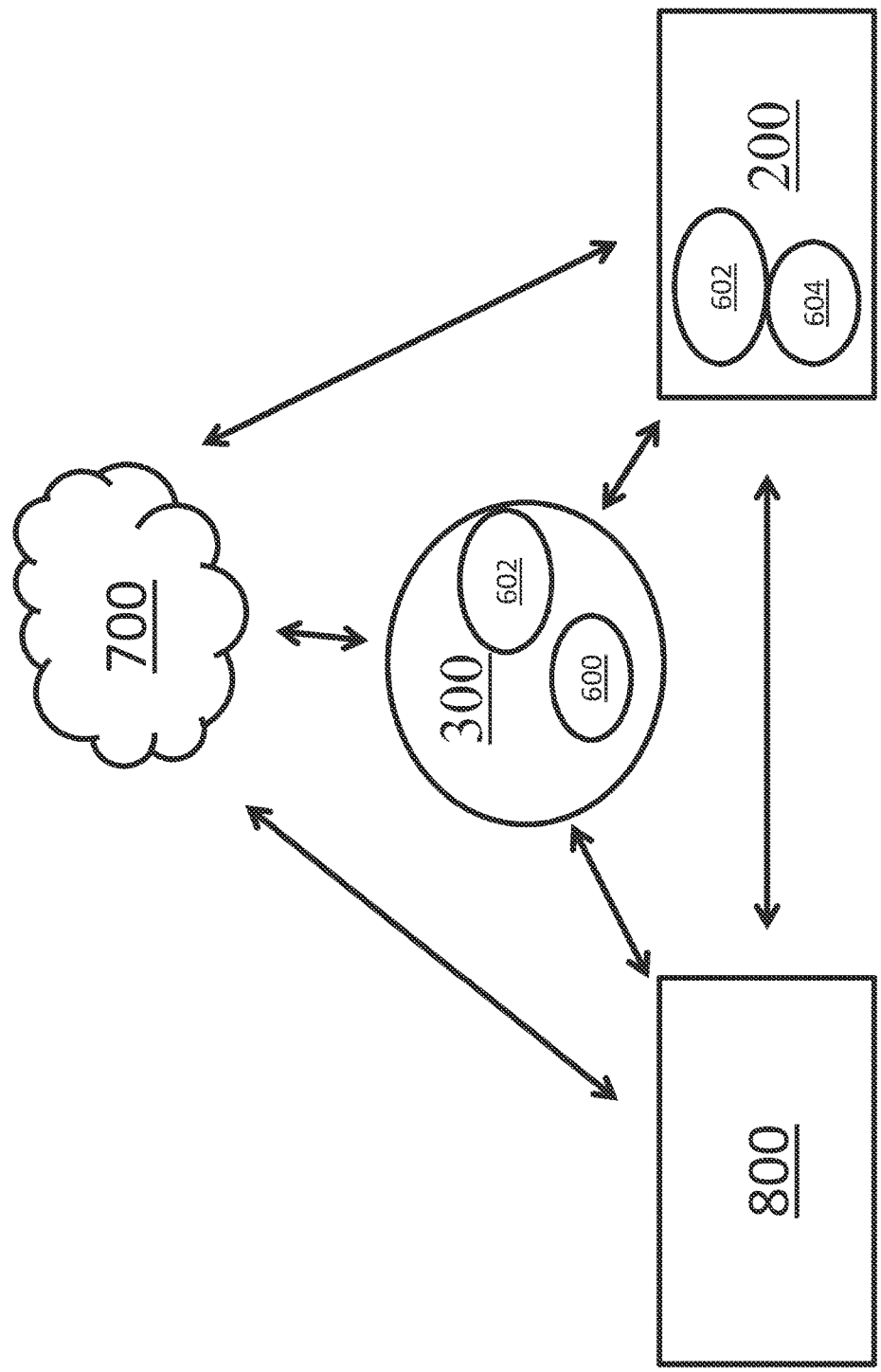
FIG. 10 shows a schematic view of a cartridge adaptor system with various communication components according to an embodiment

As shown in FIG. 10, for example, in some embodiments, cartridge 300 or dispenser or cartridge adaptor system 200 may include a receiver and/or transmitter 602 that may communicate with a customer device 800 (e.g., phone, smartphone, tablet, smart watch, etc.). In some embodiments, this communication may provide customization according to prior customer preferences. For example, when a consumer is within a relatively close distance to the cartridges 300 or dispenser, such as within a retail location, or travelling near a particular restaurant with dispenser, the consumer may receive a message on their device 800 with information on special LTOs, promotions, special flavors available in cartridge 300, or the like. In another example, a consumer may prefer Beverage A, when a consumer is within a relatively close distance to the cartridges 300 or dispenser, the consumer may receive a message on their device 800 informing the consumer where a cartridge 300 containing ingredients to make Beverage A may be found and/or purchased. In some embodiments, this communication may include instructions on how to use system, or may include a transactional component, for example, purchasing cartridge 300 through a user interface on the consumer's device 800. In some embodiments, the cartridge adaptor system 200 may include a network 700, such as, for example, a cloud or Internet such that device 800 and/or components of the cartridge adaptor system 200 may communicate over the network 700. In some embodiments, receiver/transmitter 602 associated with cartridge 300 may communicate with receiver/transmitter 602 associated with system 200. In some embodiments, receiver and/or transmitter 602 may communicate with device 800. Communication between the components shown in FIG. 10 may be one-way or multi-way communication. In some embodiments, certain components shown in FIG. 10 may be omitted.

Examples of various social media and other communication features available for incorporation to the instant systems and methods can be found in U.S. Patent Application Publication No. 2013/0096715, which is hereby incorporated by reference in its entirety. For example, in some embodiments, the systems may be configured to receive instructions in connection with a gift a beverage from one individual to another individual, or provide an interface that allows a recipient of a gift, coupon, or promotion, to hear and/or see an audio, text, and/or video message, such as a message of the party who sent the gift, coupon, or promotion to the recipient, for example between multiple devices 800 as shown in FIG. 10.

As shown in FIG. 10, in some embodiments, the system 200 may be configured to communicate with a mobile device 800 of a customer and/or a mobile software application used by a customer. Thus, the system 200 may be configured to determine whether a particular customer has ordered and/or has paid for a particular beverage and/or has redeemed a coupon, promotion, etc., that entitles the customer to receive the beverage. As shown in FIG. 10, for example, system 200 may include a communication device 604, which may be, for example a transceiver or reader, and may read for example an identifier 600, such as a barcode, an active or passive RFID tag, or the like. In some embodiments, communication device 604 is configured to communicate with another transceiver or communication device. In some embodiments, the communication device 604 may enable detection of code(s), check-in(s), and/or other awareness of certain electronic device(s) 800 of a user, e.g., a mobile communication device(s) 800, and may enable communication with such an electronic device(s) 800. In some embodiments, the system may be used to create a partnership, including a campaign, with philanthropic organizations and/or activities. In some embodiments, the system may be configured to automatically provide a beverage promotion or discount to a customer upon identification of the customer.

As discussed above, and further shown in FIG. 10, for example, an identifier 600 (e.g., barcode, an active or passive RFID tag, or the like) may be coupled to the cartridge 300 and be configured to indicate to the dispenser control attributes such as the volume of liquid to dispense through the syrup containing package, the level of carbonation in a carbonated platform, or the sweetness or brix level for a three stream platform (e.g., concentrate, sweetener, water/carbonated water). In some embodiments, information regarding identifier 600 may be communicated to the consumer through their device 800. In some embodiments, the identifier 600 may be selected by the consumer through their device 800, and communicated to the system for use in preparing the beverage.

In one embodiment, identifier 600 (e.g., barcode, an active or passive RFID tag, or the like) may be coupled to the cartridge 300 such that a communication device 604, such as a reader associated with cartridge adaptor system 200 may read identifier 600 and configure the system 200 based on the fact that the identifier 600 (and therefore the cartridge 300) is within a predetermined range. For example, as a consumer approaches the system 200 with a recently purchased or received cartridge 300, the reader 604 may read the identifier 600 and configure the system 200 by actuating the mounting arms 230 such that the cartridge holster is in position to receive the cartridge 300. In this manner, the system 200 may maintain an "off" or "rest" position while not in use and activate to an "on" or "use" position when a consumer approaches the system with a cartridge 300. In some embodiments, this function may be performed by the communication between device 800, cartridge 300 and/or system 200, with their respective transmitters and/or receivers 602, or an additional network 700.

In some embodiments, the interfaces and communication between systems 200 and/or devices may be networked together through a communications network. Communications network may include, for example: 1) a local area network (LAN); 2) a simple point-to-point network (such as a direct modem-to-modem connection); and/or 3) a wide area network (WAN), including the Internet and other commercial based network services. In one aspect, the interfaces and/or devices may be connected to social media computer through communications network or using various protocols, such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, fourth-generation (4G) cellular data communications, Global System for Mobile communications (GSM), or other wireless communication networks or the like may be used as the communications protocol. The interfaces and communication between systems and/or devices may be physically connected to each other or one or more networks via twisted pair wires, coaxial cable, fiber optics, radio waves or other media. In an aspect, known standard protocols may be used, including Flash, HTML5, etc.

The term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" but also a "content network," which is comprised of the data—attributable to a single entity—which resides across all physical networks. A "network," as used herein, may also include a network of "virtual" servers, processes, threads, or other ongoing computational processes which communicate with each other, some or all of which may be hosted on a single machine which may provide information to client servers, processes, threads or other ongoing computational processes on that same machine, other machines, or both.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. Such adaptations and modifications are intended to be within the meaning and range of equivalents of the disclosed embodiments, based on the teaching and guidance presented herein.

The Detailed Description section is intended to be used to interpret the claims. The Summary and Abstract sections may set forth one or more but not all exemplary embodiments of the present invention as contemplated by the inventor(s), and thus, are not intended to limit the present invention and the claims.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined in accordance with the claims and their equivalents.

What is claimed is:
1. A method for producing a beverage, comprising:
   providing access to a cartridge containing a beverage ingredient for a system;
   locating the cartridge to engage a cartridge adaptor system, comprising:
      a cartridge holster having a receiving portion for receiving a portion of the cartridge;
   a nozzle adaptor comprising:
      a nozzle coupling portion configured to releasably couple to a beverage dispenser nozzle; and
      a cartridge coupling portion configured to releasably couple to the cartridge;
   releasing the beverage ingredient from the cartridge;
   flowing a fluid to allow the fluid to mix with the beverage ingredient and produce a finished beverage, wherein a first fluid regulator is controlled to push a fluid through the nozzle and cartridge, thereby mixing the beverage ingredient and fluid, and
   wherein a second fluid regulator is automatically shut off when the cartridge holster is coupled to the nozzle adaptor.
2. The method of claim 1, wherein the access to a cartridge containing a beverage ingredient for a system is provided on a restricted basis of a limited time.

3. The method of claim 2, wherein the access to a cartridge containing a beverage ingredient for a system is provided on a restricted basis of a limited geographical area.

4. The method of claim 3,
wherein the second regulator is configured to suction the beverage ingredient from the cartridge and into the nozzle.

5. The method of claim 1, further comprising:
positioning the cartridge holster into a coupling position where the cartridge is engaged by both the cartridge holster and the nozzle adaptor.

6. The method of claim 5, wherein positioning the cartridge holster into the coupling position is accomplished by operating an actuation component that can actuate the cartridge holster from a loading position to the coupling position.

7. The method of claim 6, further comprising:
automatically positioning the cartridge holster in the loading position when a communication device receives a signal indicating that the user has purchased a cartridge.

8. The method of claim 1, further comprising:
piercing the cartridge with a puncturing device.

9. A method for producing a beverage, comprising:
providing access to a cartridge containing a beverage ingredient;
providing a beverage dispensing system having a cartridge holster having a receiving portion for receiving a portion of the cartridge; a nozzle adaptor having a nozzle coupling portion configured to releasably couple to a beverage dispenser nozzle; and a cartridge coupling portion configured to releasably couple to the cartridge;
aligning the cartridge with the nozzle coupling portion by positioning the cartridge holster into a coupling position where the cartridge is engaged by both the cartridge holster and the nozzle adaptor;
releasing the beverage ingredient from the cartridge by controlling a first fluid regulator to push a fluid through the nozzle and cartridge, thereby mixing the beverage ingredient and fluid, and
automatically shutting off a second fluid regulator when the cartridge holster is coupled to the nozzle adaptor.

10. The method of claim 9, wherein the access to a cartridge containing a beverage ingredient for a system is provided on a restricted basis of a limited time.

11. The method of claim 10, wherein the access to a cartridge containing a beverage ingredient for a system is provided on a restricted basis of a limited geographical area.

12. The method of claim 9, wherein positioning the cartridge holster into the coupling position is accomplished by operating an actuation component that can actuate the cartridge holster from a loading position to the coupling position.

13. The method of claim 12, further comprising:
automatically positioning the cartridge holster in the loading position when a communication device receives a signal indicating that the user has purchased a cartridge.

14. The method of claim 9, further comprising:
piercing the cartridge with a puncturing device.

* * * * *